United States Patent [19]

Wade

[11] 3,937,101

[45] Feb. 10, 1976

[54] STEERING WHEEL WITH PAD CONTAINER

[76] Inventor: Henry M. Wade, 33040 Roberts St., Elsinore, Calif. 92330

[22] Filed: May 28, 1974

[21] Appl. No.: 473,371

[52] U.S. Cl. .................................. 74/552; D12/175
[51] Int. Cl.² ...................... B62D 1/04; B62D 1/08
[58] Field of Search .................. 74/552, 558, 558.5; D12/175

[56] References Cited
UNITED STATES PATENTS

| | | | |
|---|---|---|---|
| 2,025,977 | 12/1935 | Getty | 74/552 X |
| 2,699,034 | 1/1955 | Maire | 74/552 X |
| 2,707,406 | 5/1955 | Sampson | 74/552 X |
| 2,828,645 | 4/1958 | Wilfert | 74/552 X |
| 3,087,352 | 4/1963 | Daniel | 74/552 |
| 3,364,785 | 1/1968 | Geller | 74/552 |

*Primary Examiner*—Samuel Scott
*Assistant Examiner*—F. D. Shoemaker
*Attorney, Agent, or Firm*—Ronald L. Juniper

[57] ABSTRACT

A steering wheel for a vehicle including as part of its center portion a recessed container for holding a writing pad which is constructed to form an attractive integral structure that is also utilitarian. A pen or pencil may also be carried in said container.

7 Claims, 5 Drawing Figures

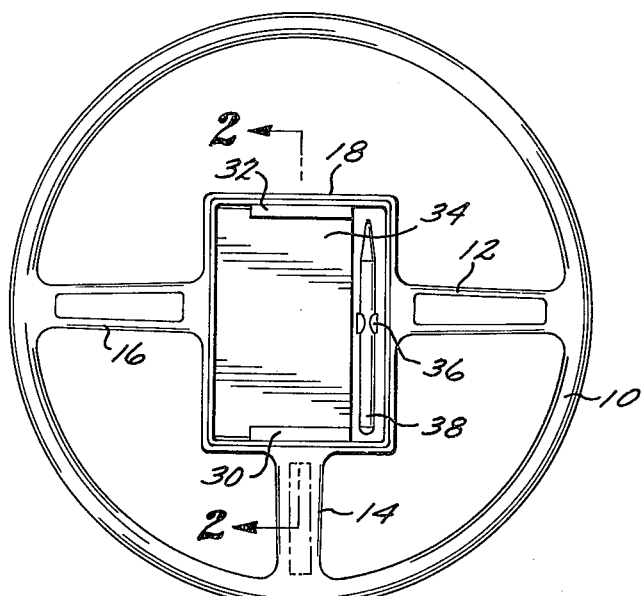
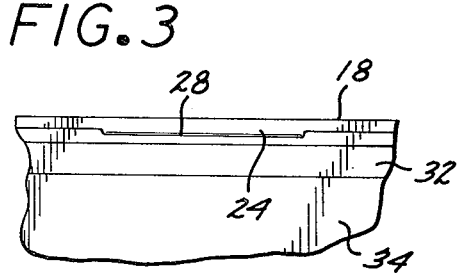
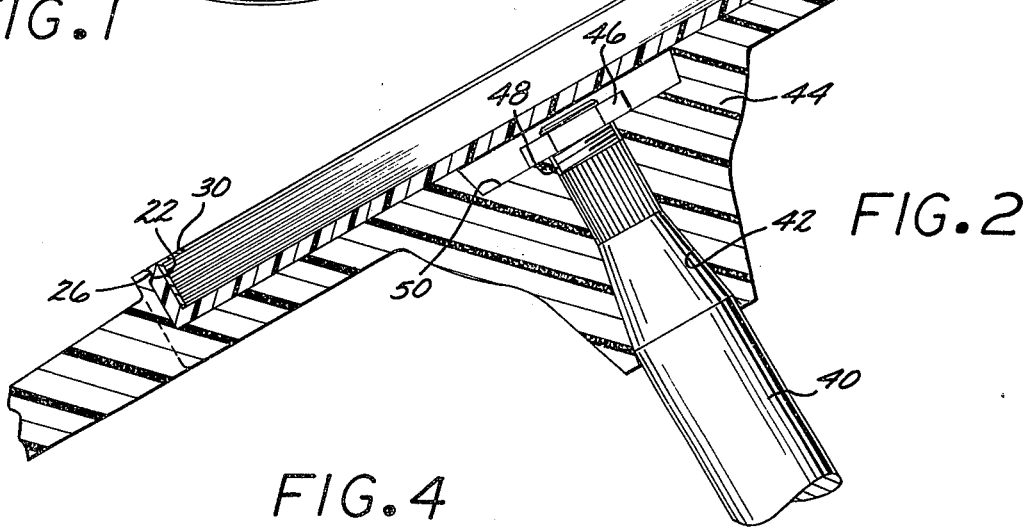
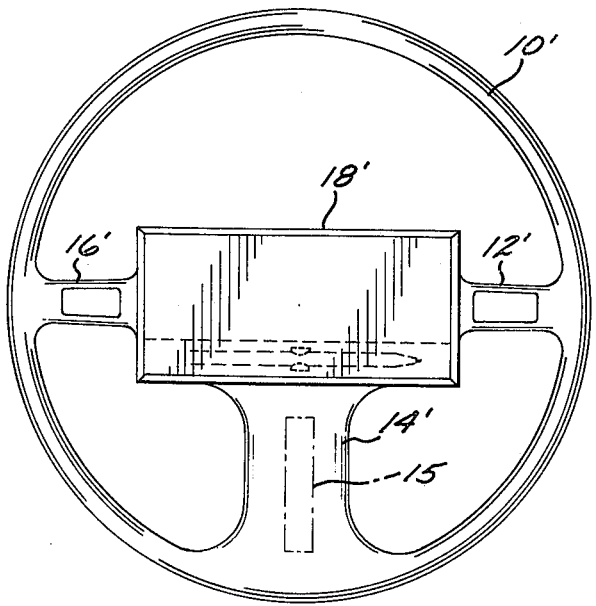
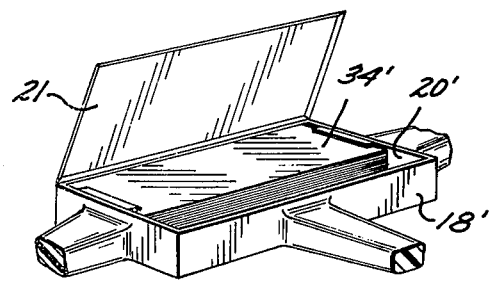

STEERING WHEEL WITH PAD CONTAINER

BACKGROUND OF THE INVENTION

When traveling in a vehicle, it is often desirable to be able for the driver to stop and jot down notes. However, until this invention, the standard steering wheel had no handy and convenient writing pad. The pads conventionally available were awkward and inconvenient to use. If attached to a steering wheel, they were generally unattractive and a possible safety hazard. Moreover, the attaching mechanism was subject to slippage and damage to the steering wheel. Hence, though a need has existed for such a device, the attachable pads on the market had too many defects.

SUMMARY OF THE INVENTION

Accordingly, this invention was developed which, briefly, is a steering wheel with an integral pad and container as the center part of the steering wheel. The container is adapted to clip into a matingly shaped portion of the steering wheel and the pad is mounted on the container. The steering wheel can be mounted on any standard steering post and secured thereto by attaching means opening through the steering wheel center beneath the portion where the container is clipped into place. A pen or pencil is also carried in said container.

BRIEF DESCRIPTION OF THE DRAWINGS

FIG. 1 is a top plan view of an embodiment of this invention, showing the container centered as a vertically positioned, rectangularly shaped portion of the steering wheel.

FIG. 2 is a fragmented, sectional view of the steering wheel as disclosed in FIG. 1 showing the relative depth of the container and the attachment of the steering wheel to a steering post.

FIG. 3 is a fragmented sectional view of clip attachment means taken through 3—3 in FIG. 2.

FIG. 4 is a top plan view of another form of this invention, shown with the container as a normally horizontally positioned rectangle.

FIG. 5 is a isometric, partly fragmented view showing the container as in FIG. 4 with a lid hinged thereon in open position.

DETAILED DESCRIPTION OF THE INVENTION

With reference to the form of this invention shown in FIGS. 1 and 2 in the drawings, a circular steering wheel 10 with three spokes 12, 14 and 16 connected to a generally vertically positioned rectangular container receptacle 18 recessed and molded as an integral part of the steering wheel 10.

The container receptacle 18 is adapted to receive a mating pad container 20 best shown in FIG. 2. It securely snaps into place within the receptacle 18 through its resiliently releasable end tabs 22 and 24 engaging in mating recessed 26 and 28, respectively, which are formed in the opposite ends of receptacle 18.

The container 20 is formed with inwardly overhanging lips 30 and 32 on each of its opposing ends. These lips are adapted to retain a paper pad 34 in place within the recessed area of container 20. A clip 36 is attached within the container 20 next to the pad 34 to hold a pencil 38.

The steering wheel 10 is attached to a steering wheel post 40 through means of a hold 42 cut through the hub 44 of the wheel 10 which is beneath the receptacle 18. It is secured firmly in place by a nut 46 screwed onto a matingly threaded end 48 of the post 40 and bearing against the floor of a surrounding recess 50 in receptacle 18 as best shown in FIG. 2.

The form shown in FIGS. 4 and 5 is basically the same as shown in FIGS. 1, 2 and 3 with like parts given the same numbers primed except that the receptacle 18' is normally positioned horizontally and the spoke 14' is enlarged, so as to have more room for an optional name plate 15 attached thereon. Also, the container 20' is provided with a lid 21 hingedly mounted thereto, in order to cover the pad 34' carried therein.

For use this steering wheel can be easily mounted on any standard steering wheel post as shown in FIG. 2. To do so, the container 20 is snapped out of the receptacle 18 and the nut 46 is screwed tight on the threaded end 46 of the post 40 after the hub 44 is slid thereon. The container 20 is then snapped back in place in the receptacle 18 with a pad 34 positioned in front of the driver ready for use.

Though several particular forms of this invention have been shown and described, other variations are intended to be comprehended within the spirit of this invention as defined by the following claims.

What is claimed is:

1. A steering wheel adapted to be mounted on a steering post including an outer ring, an inner hub, elements interconnecting said outer ring and said hub substantially centrally within said outer ring wherein the upper portion of said hub is formed as a recessed receptacle adapted to receive a mating writing pad container, said container engaged with and releasably mounted in said receptacle by means of resiliently movable tabs locking in mating grooves and a writing pad carried in said container.

2. A steering wheel as defined in claim 1 wherein said pad is securely held in said container by means of overhanging lips extending from the upper edges of said container.

3. A steering wheel as defined in claim 2 wherein said hub is provided with a central opening extending therethrough which is adapted to receive a steering post, so as to protrude slightly beyond said opening when positioned therein, wherein said steering wheel is mounted and released from said steering post by means of an attaching means engaging the protruding portion of said steering post and bearing against the adjacent portion of said steering wheel.

4. A steering wheel as defined in claim 3 wherein said attaching means is a nut screwed onto a matingly threaded end portion of said steering post and the part of said steering wheel which it bears against, is a surrounding recess cut deeply enough into the receptacle of said steering wheel that the end of said steering post is below the container when clipped into the receptacle portion.

5. A steering wheel as defined in claim 2 wherein the receptacle and container are rectangular in shape.

6. A steering wheel as defined in claim 5 which is provided with a hingedly mounted lid on said container.

7. A steering wheel as defined in claim 1 wherein a writing instrument is carried in said container.

* * * * *